J. C. LEIDY.
STALK-CUTTER.
No. 174,687. Patented March 14, 1876.
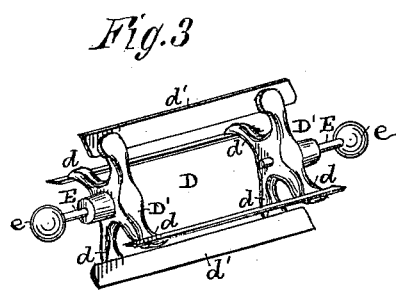
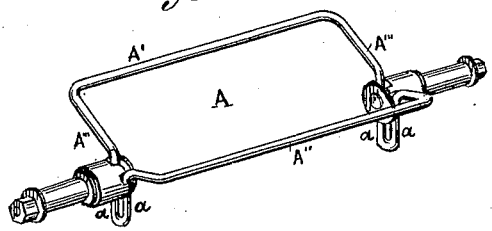
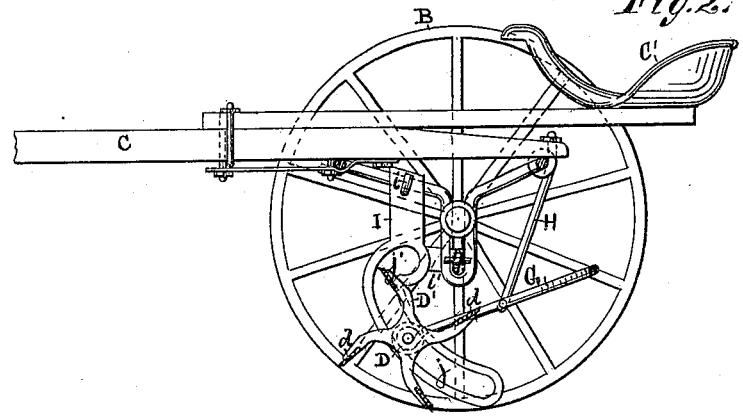
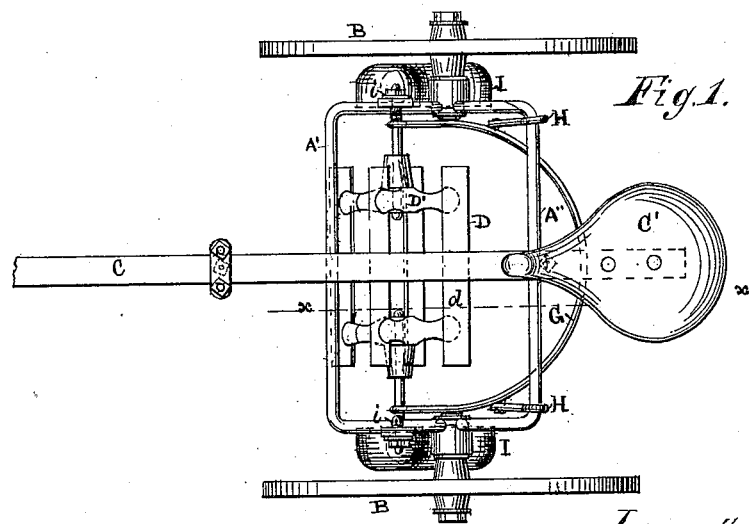

UNITED STATES PATENT OFFICE.

JAMES C. LEIDY, OF GALESBURG, ILLINOIS.

IMPROVEMENT IN STALK-CUTTERS.

Specification forming part of Letters Patent No. 174,687, dated March 14, 1876; application filed November 12, 1875.

*To all whom it may concern:*

Be it known that I, JAMES C. LEIDY, of Galesburg, county of Knox and State of Illinois, have invented certain Improvements in Stalk-Cutters, of which the following is a specification:

The nature of my invention relates to improvements in machines for cutting cornstalks, cotton-stalks, &c., in the field, into short and suitable lengths for turning under with an ordinary plow.

The invention consists, first, in the peculiar construction of the cylinder of cutter's frame; and, second, in the combination of the cylinders of cutters, their attaching and suspending devices, with an axle of peculiar and simple construction, all as hereinafter fully described.

In the accompanying drawings, Figure 1 is a top view of a machine embodying my invention. Fig. 2 is a sectional view of the same on the line $x$ $x$ in Fig. 1. Fig. 3 is a perspective view of the cylinder of cutters, and Fig. 4 is a perspective view of the axle.

Referring to the parts by letters, letter A represents the axle, formed of a single bar of iron, bent so as to form a rectangle, with front side A' and rear side A'', and right and left hand sides A''', the sides A''' midway of their lengths bent or projected downward to form two bars, $a$ $a$, to which the supporting-wheels B are adjustably attached for regulating the depth of cut.

C is the draft-pole, mounted on the frame A' A'', and provided with a driver's seat, C'. D is the cylinder of cutters, constructed as follows: Two heads, D', are each provided with radial arms $d$, to the outer ends of which the cutter-blades $d'$ are attached, as shown in the drawings, so as to connect the two heads D' without a central shaft, and thus form a cheap and simple cylinder of cutters, without any central bar to aid in clogging with dirt or stalks and other rubbish. From each head D' a short shaft, E, is projected outward to form journals, as hereinafter described, and to receive the ends of the lifting-lever frame G, which frame G is connected, by pendants H, with the bar A'' in such manner that the pendants H become fulcrums, on which the lever-frame G may be oscillated to raise and lower the cylinder of cutters by means of the driver placing his feet on the rear end of the frame G.

I I are hangers connected to the sides A''' of the axle by hook-bolts $i$, and to the projections $a$ $a$ by lugs $i$, and bolts, as plainly shown in the drawings. The hangers I are constructed so as to form bearings for the journals of the cutter-cylinder. The lower portion of the hangers are tubular and curved in the arc of a circle, and have each a slot or groove, $j$, enlarged at the upper end and turned rearward, as shown at $j'$ in Fig. 2 of the drawings. On the ends of the shafts E are round or ball-shaped journals $e$, which are passed into the grooves $j$ through the enlarged portion $j'$, and thereby pivot or connect the cutter-cylinder to the hanger I.

When the machine is in operation the rearward draft on the cylinder of cutters will draw the journals on the ends of the shafts E back, and thereby force them into the lower and rearward end of the hangers or tubular bearings I, thus elevating the main frame and supporting-wheels B, and throwing the weight of the frame, wheels, and driver, onto the cylinder of cutters. This construction of axle and of cylinder of cutters forms a cheap and effectual machine, and the same axle and supporting-wheels may be used for attachment of working parts of cultivators.

I claim as new—

1. The cylinder of cutters D, constructed as described, with heads D', having radial arms $d$, to which the blades $d'$ are attached, so as to connect the heads D and hold the cutters in position without a central shaft, and provided with the short shafts E, substantially as and for the purpose specified.

2. The lever-frame G and pendants H, in combination with the cylinder of cutters D and framed axle A, substantially as and for the purpose specified.

JAMES C. LEIDY.

Witnesses:
   THOS. MCKEE,
   W. B. RICHARDS.